June 23, 1970   J. S. STRANCE ET AL   3,516,626
AIRCRAFT LAUNCHING SYSTEM
Filed June 6, 1969
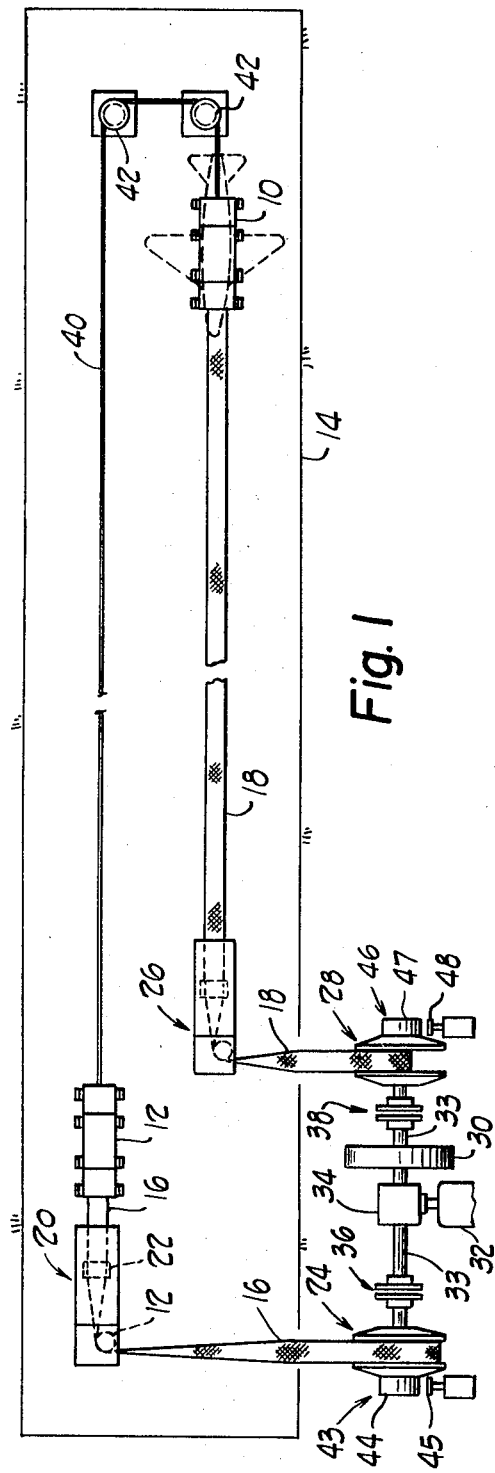
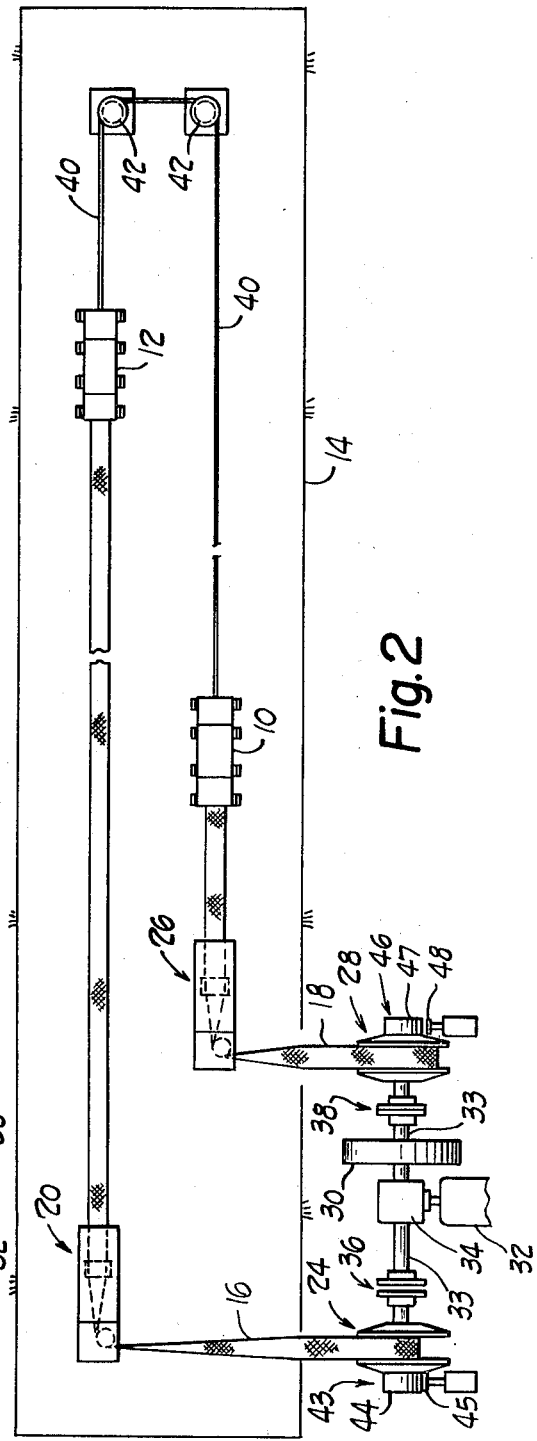
INVENTORS
ROBERT W. CRUGER
JOHN S. STRANCE
BY
*Meyer, Tilberry & Body.*
ATTORNEYS.

United States Patent Office 3,516,626
Patented June 23, 1970

3,516,626
AIRCRAFT LAUNCHING SYSTEM
John S. Strance, % Eagle Signal Co., 736 Federal St., Davenport, Iowa 52803, and Robert W. Cruger, Springfield, Pa. (% E. W. Bliss Company, 101 Chester Road, Swarthmore, Pa. 19081)
Continuation-in-part of application Ser. No. 617,939, Feb. 23, 1967. This application June 6, 1969, Ser. No. 840,093
Int. Cl. B64f 1/08
U.S. Cl. 244—63                12 Claims

ABSTRACT OF THE DISCLOSURE

A vehicle accelerating apparatus including a pair of vehicle engaging dollies arranged to traverse separate spaced parallel paths longitudinally of a runway. Each of the dollies is separately connected at one end to independent winding reels by elongated flexible synthetic tapes. The opposite ends of the dollies are interconnected by an elongated cable which passes around runway mounted sheaves. The winding reels are arranged to be rotated by a single power source comprised of an energy storing flywheel and an engine. Clutches are provided to connect either of the reels to the power source. Connection of one of the reels to the power source causes it to rotate to wind in the tape and dolly connected thereto and accelerate the dolly in a first direction. Simultaneously, because of the cable interconnection between the dollies, the other dolly is caused to move in a second direction and unwind the other tape from its winding reel. In this manner, as one dolly is being used for accelerating a vehicle the other dolly is being moved to a position where it can subsequently be used for accelerating a vehicle.

This application is a continuation-in-part of our copending application Ser. No. 617,939, filed Feb. 23, 1967 now abandoned.

The present invention is directed toward the art of vehicle accelerating systems and more particularly to an improved aircraft launching apparatus.

The invention is particularly applicable for the launching or catapulting of an aircraft, and it will be described with particular reference thereto; however, it is appreciated that the invention is capable of broader application and could be used in various other vehicle accelerating systems.

A variety of aircraft launching systems are presently available. Normally, these systems involve the use of an aircraft-engaging dolly which is accelerated longitudinally down a runway. The dolly is generally accelerated by the use of a cable that is operatively connected to a reel associated with a clutch-engaged power source comprised of a motor or engine and an energy storing flywheel. The power source functions to rotate rapidly the reel and wind in the cable, thereby accelerating the dolly and the aircraft from a first position, known as the battery position, to a second position, known as the launch position. These systems are generally satisfactory, however, they do have a disadvantage. After each launch, it is necessary to return the dolly to battery position. The time required to return the dolly to battery position increases the time of the launch cycle, i.e. the time elapsed between the launching of successive aircraft.

To reduce the length of the launch cycle to an acceptable level, it has been the practice to provide two of the above-described systems on each runway. This permits one system to be launching an aircraft while the other system is being returned to battery position.

Such double systems obviously increase the cost of the installation. Additionally, when the systems are used for expeditionary type purposes the increased weight and time required for installation are particularly undesirable.

The present invention provides a launching system which overcomes the above problems and permits a single power source to perform the functions which previously required two power sources.

In accordance with the present invention, a runway positioned launching apparatus is provided which includes first and second aircraft engaging means connected respectively to first and second elongated tension means. First and second winding means are provided for winding in said first and second tension members, respectively. Power means selectively connectable through drive means to either the first or the second winding means are also provided. Additionally, guide means function to cause said vehicle engaging means to traverse spaced parallel launch paths which extend in side-by-side relationship longitudinally of the runway, and means are provided to interconnect the vehicle engaging means to cause movement of one in a first direction along its respective path and to cause the other to move in an opposite direction along its respective path.

It is therefore an object of the invention to provide an improved vehicle launching system which overcomes certain disadvantages of prior art systems.

A further object of the invention is to provide an improved launching apparatus which is especially applicable for expeditionary type use.

Another object is the provision of a vehicle launching apparatus which permits a single power source to perform the function which previously required two power sources.

These and other objects and advantages will become apparent from the following detailed description of a preferred embodiment of the invention when read in connection with the accompanying drawings wherein:

FIG. 1 is a diagrammatic plan view showing the general organization of parts in one prelaunch configuration; and FIG. 2 is a diagrammatic plan view showing the general organization of parts during the acceleration portion of a launch cycle to the left.

Referring now to the drawings wherein the showings are for the purpose of illustrating a preferred embodiment of the invention only and not for the purpose of limiting same, FIG. 1 shows a runway installed aircraft launching apparatus constructed in accordance with the present invention and including a pair of aircraft engaging means shown in the form of wheeled dollies 10 and 12. The dollies are adapted to move in spaced, generally parallel, launch paths which extend substantially longitudinally of the runway 14.

Connected to the left hand end of each of the dollies 10 and 12 are elongated flexible tension members 16 and 18 respectively. Member 16 extends from dolly 10 around a guide means 20 comprised of fixed position, rotatable sheaves 22, into engagement with a first winding means 24, shown as a rotatable winding reel having its axis positioned horizontally. Member 18 likewise extends from the left end of dolly 10 around a guide means 26, constructed in the same manner as guide means 20, and into engagement with a second winding means 28. Winding means 28 is constructed and arranged in generally the same manner as winding means 24.

Tension members 16 and 18 could take a variety of forms and be constructed from a variety of materials. However, in accordance with a limited aspect of the invention, the tension members are preferably in the form of flat woven belts or tapes of synthetic material such as nylon. Such a tape is described in detail in U.S. Pat. No.

Re. 25,406, which is incorporated herein by reference to the extent necessary for a complete understanding of one type of tension member suitable for practice of the present invention.

Although a variety of different power means could be used to rotate the winding means 24 and 28 to wind in the respective tension members 16 and 18, as shown in the preferred embodiment the power means preferably comprise an energy storing flywheel 30 driven by a free turbine engine 32 through a right angle gear box 34. The horizontally extending shaft 33 on which the flywheel is mounted is selectively connectable to the winding means 24 and 28 through drive means which include clutches 36 and 38. Clutches 36 and 38 are preferably of the heavy duty air or hydraulically operated type.

As is readily apparent, engagement of either clutch 36 or 38 will cause its respective winding means to be rotated and the tension member connected thereto to be wound in. This causes acceleration of the dolly connected thereto to the left along its respective launch path. In order to permit the dollies to be decelerated and stopped as they approach the end of their launch paths, as well as to cause unwinding of one of the winding means in response to winding of the other, means are provided to drivingly interconnect the right end of each dolly. The means necessary to perform this function could take a variety of forms; however, according to the preferred embodiment they include an elongated tension member 40, shown in the form of a wire rope or cable, which is connected between the right ends of the dollies and around a guide means in the form of fixed position rotatable sheaves 42. The means to decelerate and stop the dollies as they approach the end of their launch paths comprise heavy duty brakes 43 and 46 comprised of drums 44, 47 and brake shoe actuators 45, 48, respectively. The brakes are adapted to apply a braking force to winding means 24 and 28 respectively.

Although tension members 16, 18 and 40 are shown and have been described as separate independent members they could comprise a single continuous length of synthetic tape. This arrangement is not preferred however, because of the extra sheaves and guiding means required to turn the flat tape through the 360° reversal required by the present system. Additionally, because most present day jet aircraft are launched in a nose-up position, the jet exhaust is directed slightly downwardly and synthetic tape used in that section of the system adjacent the aircraft engaging dolly could be damaged. For this reason, it may, at times, be desirable to connect the aircraft engaging dolly to the members 16 and 18 by lengths of steel cable. In all modifications of the tension members however, it is distinctly preferable that those sections which are to be wound and unwound from the winding means be comprised of synthetic tape or belt.

Further, it is desirable to have an excess of the tape wound on each of the winding reels. This permits the "battery" or start of launch positions to be varied longitudinally of the launch paths to suit individual needs. Additionally, the provision of the excess tape increases the effective winding diameter of reels and permits the reel being unwound to rotate at a lower RPM as the end of the launch stroke is approached.

One launch cycle of the above-described launching apparatus is as follows:

With dolly 10 at the right end of its launch path as shown in FIG. 1, the brake shoes 45 and 48 are disengaged, as are clutches 36 and 38. Engine 32 is started and flywheel 30 is brought up to speed and the aircraft to be launched is connected and made ready on dolly 10. When the aircraft is readied and flywheel 30 is rotating at the required speed, clutch 38 is engaged causing winding means 28 to be rapidly rotated to reel in tension member 18 and accelerate dolly 10 and the aircraft connected thereto to the left. This simultaneously causes dolly 12 to move to the right and unwind tension member 16 from winding means 24. Throughout this acceleration portion of the cycle, brake 43 will be actuated to apply a slight braking force to winding means 24 to maintain tension in tension members 18 and 40 and thereby prevent undesired oscillation, etc.

After the aircraft has been accelerated to the desired speed, clutch 38 is disengaged and brake 43 applied to bring the system to rest. At this time the dollies are at the opposite ends of their launch paths as shown in FIG. 2. The next cycle can now be initiated by attaching an aircraft to dolly 12 and reversing the above described operation, i.e. engaging clutch 36 and utilizing brake 47 to apply the tensioning and braking forces to the system.

Although the operation of the system has been described with reference to making launches to the left (as viewed in FIGS. 1 and 2) it is apparent that the system could equally well be used to make launches to the right. In such case, the operation of the respective clutches and brakes would be reversed from that described above. For example, if it were desired to utilize dolly 10 for a launch to the right, then clutch 36 would be engaged and brake 46 utilized to apply the tensioning and braking forces.

As is apparent from the aforegoing description, the present invention provides an improved and highly versatile accelerating system. Because of the arrangement of the system, a single power source can perform the functions which previously required two power sources.

The invention has been described in great detail sufficient to enable one of ordinary skill in the art to practice the invention.

One important aspect of the present invention is the provision for successively launching aircraft in the same direction without any delays in re-setting the apparatus or modifying the operation of the power source. As shown in FIGS. 1 and 2, tapes 16 and 18 are respectively coilable on the top sides of reels 24 and 28 when each reel is rotated clockwise as viewed from the narrow bottom edge of the sheet on which FIGS. 1 and 2 are drawn. That is, flywheel 30 rotates in a single driving direction to selectively drive either reel 24 or 28 to wind up either tape 16 or tape 18. In addition, motor 32 operates in a single direction to drive flywheel 30 in a single direction through transmission 34. No reversing of motor 32, transmission 34, or flywheel 30 is necessary to change drive from reel 24 to reel 28 and vice-versa. This makes operation of the apparatus extremely rapid without loss of time or energy which accompanies devices which must be shifted or reversed. For example, reference may be had to FIG. 1 in in which reel 28 is rotatably driven by flywheel 30 through clutch 38 to launch an aircraft attached to dolly 10. Once such aircraft is launched, clutch 38 is disengaged and brake 45 is engaged to stop rotation of reels 24 and 28. Both of clutches 36 and 38 are disengaged so that flywheel 30 continues to rotate in the same direction and will be brought up to its maximum speed by motor 32 in the short time required to brake reels 24 and 28 to a stop. Once an aircraft is launched with dolly 10 the apparatus assumes the condition shown in FIG. 2. Dolly 12 is in position for launching a second aircraft in the same direction as the first simply by engaging clutch 36 to drive reel 24 with flywheel 30 and coil tape 16 on reel 24. If it were necessary to bring flywheel 30 to a stop, and to reverse its direction of rotation before launching another aircraft, a considerable amount of time would be wasted. In addition, if it were necessary to return dolly 10 to the position shown in FIG. 1 after launching an aircraft, a number of aircraft could be launched only half as fast as with the arrangement of the present invention wherein a second dolly is automatically in position following launching of an aircraft by a first dolly.

While the invention has been described with reference to a preferred embodiment it is obvious that modifications and alterations will occur to others upon reading and understanding this specification.

Having thus described our invention, we claim:

1. A runway mounted vehicle launching apparatus comprising: a first elongated flexible tension member terminating in first and second end portions; a second elongated flexible tension member terminating in first and second end portions; a first vehicle engaging means connected to the first end portion of said first member; a second vehicle engaging means connected to the first end portion of said second member; first rotatable winding means connected to the second end portion of said first member for winding up said first member; second rotatable winding means mounted for rotation independent of said first winding means and connected to the second end portion of said second member for winding up said second member; power means; drive means for selectively connecting said power means to said first or second winding means for selectively winding up said first or said second members respectively; said power means operating in a single driving direction to wind up either said first or said second member; guide means for positioning said first and second members longitudinally of said runway to define generally parallel and side-by-side launch paths; and, means interconnecting said first end portions of said first and second members for causing a winding up of one of said members on its respective winding means to produce an unwinding of the other of said members from its respective winding means.

2. The apparatus as defined in claim 1 wherein said first and second members are woven belts of synthetic material.

3. The apparatus as defined in claim 1 wherein said first and second vehicle engaging means are wheeled dollies.

4. The apparatus as defined in claim 1 including brake means selectively actuatable for retarding movement of said winding means.

5. The apparatus as defined in claim 1 wherein said means interconnecting said first and second members comprise a cable member.

6. The apparatus as defined in claim 1 wherein said guide means comprise rotatable sheaves.

7. The apparatus as defined in claim 1 wherein said power means includes a flywheel.

8. The apparatus as defined in claim 1 wherein said drive means include clutches.

9. A runway positioned vehicle launching apparatus comprising first and second vehicle-engaging means connected respectively to first and second elongated flexible tension members; power means; first and second independently rotatable winding means for winding in said first and second member respectively; means for selectively connecting said power means to said first or said second winding means for causing movement of said vehicle engaging means; said power means operating in a single driving direction to wind up either said first or said second member; and, means for interconnecting said vehicle engaging means for causing a movement of one of said vehicle engaging means in a first direction along its respective launch path to cause said other vehicle engaging means to move in the opposite direction along its respective launch path.

10. Apparatus as defined in claim 9 wherein said guide means comprise rotatable sheaves.

11. A runway mounted vehicle launching apparatus comprising:
a first winding drum member;
a second winding drum member;
means mounting said first and second winding drum members for independent relative rotation;
a first elongated flexible tension member having a first end portion connected to said first drum member and wound thereon, and a second end portion extending therefrom;
a second elongated flexible tension member having a first end portion connected to said second drum member and wound thereon, and its second end portion extending therefrom;
a single power means for rotating said drum members;
clutch means for selectively connecting said power means to either said first drum member or said second drum member for winding said first or said second winding drum member; said power means operating in a single driving direction to wind up either said first or said second member;
independent brake means for each of said drum members;
guide means for positioning said second end portions of said first and second tension members longitudinally of said runway to define generally parallel side-by-side launch paths, and,
means interconnecting said second end portions of said tension members whereby a winding up of one of said tension members on its winding member causes an unwinding of the other tension member from its winding member.

12. A method of launching aircraft with apparatus including first and second independently rotatable reel means having interconnected elongated flexible coilable means attached thereto, comprising the steps of; continuously drivingly rotating flywheel means in a predetermined direction, connecting an aircraft with said coilable means, drivingly coupling said flywheel means to said first reel means to rotate said first reel means in a coiling direction for coiling said coilable means thereon and causing tension in said coilable means to rotate said second reel means in an uncoiling direction for uncoiling said coilable means therefrom, said coiling of said coiling means on said first reel means applying a towing force in a launching direction to said aircraft, continuing to coil said coilable means on said first reel means until said aircraft reaches takeoff velocity, disengaging said flywheel from driving engagement with said first reel means, applying braking force to said reel means to stop rotation thereof while continuing to drive said flywheel in said predetermined direction, connecting another aircraft with said coilable means, drivingly coupling said flywheel with said second reel means to rotate said second reel means in a coiling direction for coiling said coilable means thereon and causing tension in said coilable means to rotate said first reel means in an uncoiling direction for uncoiling said coilable means therefrom, said coiling of said coilable means on said second reel means applying a towing force to said other aircraft in the same launching direction as said first aircraft, continuing to coil said coilable means on said second reel means until said aircraft reaches takeoff velocity, disengaging said flywheel from driving engagement with said second reel means, applying braking force to said reel means to stop rotation thereof while continuing to drive said flywheel in said predetermined direction, and successively repeating said operations with said first and second reel means.

References Cited

UNITED STATES PATENTS 2,872,132  2/1959  Doolittle _____ 244—63

FOREIGN PATENTS 949,325  2/1949  France.
825,941  12/1959  Great Britain.

DUANE A. REGER, Primary Examiner

P. E. SAUBERER, Assistant Examiner